United States Patent

Bolz

[11] Patent Number: 6,146,294
[45] Date of Patent: Nov. 14, 2000

[54] METHOD AND DEVICE FOR THE OPERATION OF A FLEXIBLE DRIVE MECHANISM

[75] Inventor: Martin-Peter Bolz, Oberstenfeld, Germany

[73] Assignee: Robert Bosch GmbH, Stuttgart, Germany

[21] Appl. No.: 09/077,071

[22] PCT Filed: May 27, 1997

[86] PCT No.: PCT/DE97/01104

§ 371 Date: Sep. 14, 1998

§ 102(e) Date: Sep. 14, 1998

[87] PCT Pub. No.: WO98/12457

PCT Pub. Date: Mar. 26, 1998

[30] Foreign Application Priority Data

Sep. 19, 1996 [DE] Germany .................... 196 38 277

[51] Int. Cl.[7] .............. F16H 55/56; F16H 9/00; F16H 59/00
[52] U.S. Cl. ................ 474/8; 474/70; 474/80
[58] Field of Search ............... 474/8, 201, 102, 474/103, 2, 3, 80, 83, 69–71; 477/34, 36, 37, 44

[56] References Cited

U.S. PATENT DOCUMENTS

| 3,543,597 | 12/1970 | Schamphelaere et al. ......... 474/103 |
| 4,061,222 | 12/1977 | Rushing ......................... 474/103 |
| 4,557,372 | 12/1985 | Rajagopal ........................ 474/103 |
| 4,959,040 | 9/1990 | Gardner et al. .................. 474/103 |
| 5,098,345 | 3/1992 | Van Vuuren ...................... 474/8 |
| 5,173,084 | 12/1992 | Lemieux ......................... 474/8 |
| 5,213,548 | 5/1993 | Colbert et al. .................. 474/103 |
| 5,328,412 | 7/1994 | Durum ........................... 474/8 |
| 5,518,457 | 5/1996 | Seki et al. ..................... 474/102 |
| 5,662,538 | 9/1997 | Wang ............................. 474/103 |

FOREIGN PATENT DOCUMENTS

0 451 887  10/1991  European Pat. Off. .

Primary Examiner—David A. Bucci
Assistant Examiner—Matthew A. Kaness
Attorney, Agent, or Firm—Kenyon & Kenyon

[57] ABSTRACT

A belt transmission having an adjustable transmission ratio and a drive end and an output end. The belt of the belt transmission establishes an operative mechanical connection where the slip can be influenced between the drive end and the output end, where an influencing device influences the slip of the belt means. At least two sensor units are provided and are arranged in the area of the belt and between the drive end and an output end. The signals of these sensor units are then sent to the influencing device to influence the slip of the belt. With the sensor units arranged in this manner, it is possible in a simple manner to detect the actual slip with a high accuracy and to use this to influence the slip.

20 Claims, 5 Drawing Sheets

METHOD AND DEVICE FOR THE OPERATION OF A FLEXIBLE DRIVE MECHANISM

Several variations of continuously variable transmissions are known. With respect to belt transmission should be systems belt, preferably a push belt or a V belt or a chain, preferably a tension chain, is arranged between a drive end connected to the vehicle and an output end connected to the wheels of the vehicle. The drive end and the output end each generally have an axially displaceable V-pulley. Such systems are described, for example, in European Published Patent Application No. 451,887 and German Published Patent Application No. 44 11 628. The efficiency of such a transmission depends to a significant extent on the dimensioning of the force of the pulleys acting against the belt element so that slippage between the pulleys and the belt element is reliably prevented. This force can be dimensioned with a certain safety margin based on the largest torque to be transmitted. However, during a normal operation of the vehicle, i.e., at lower transmission torques, this generates excessively high friction forces and hydraulic losses in the gear.

One possibility of improving this situation is to adapt this force to the instantaneous transmission torque. Therefore, in European Published Patent Application No. 451,887, this force is controlled as a function of engine torque. Another possibility is to reduce this force to a level that is just sufficient to reliably prevent slipping at the prevailing transmission torque. Drive slip control is described, for example, in the German Published Patent Application No. 44 11 628. The most accurate possible knowledge of the instantaneous slip is required for such a drive slip control. It is therefore proposed in German Published Patent Application No. 44 11 628 that the speed of the belt element be detected.

ADVANTAGES OF THE INVENTION

An object of the present invention is to detect a slip in a simple accurate manner. As mentioned above, the present invention relates to a belt transmission with an adjustable transmission ratio, having a drive end and an output end. The belt means establishes an operative mechanical connection between the drive end and the output end, with the slip behavior of the connection being subject to influence, an influencing means is provided to influence the slip of the belt means.

In the present invention at least two sensor units are provided and are arranged in the area of the belt means, between the drive end and the output end. The signals of these sensor units are then sent according to the present invention to the influencing means for influencing the slip of the belt means. Due to the sensor units arranged according to the present invention, it is possible to easily determine the actual slip to a high degree of accuracy and to use it to influence the slip.

It is especially advantageous to arrange the sensor units in such a way that the sensor units detect changes in relative position between the belt means and the sensor units.

It is also advantageous that the belt means are subdivided into individual segments which move past the sensor units for establishing the operative mechanical connection between the drive end and the output end. The sensor units are then arranged so that their signals represent the segments moving past the sensor units.

As mentioned previously, the drive end and/or the output end have at least one axially displaceable element having essentially the form of a V-pulley. As the belt means, at least one belt, preferably a push belt, or a belt or chain may be stretched between pulleys representing the drive end and the output end, where the slip between the belt means and the pair of pulleys around which the belt means are wrapped can be influenced.

It is especially advantageous if one of the sensor units is arranged so that its signals represent the segments moving toward the drive end or the output end, while the other sensor units are arranged so that their signals represent the segments moving away from the drive end or output end.

The influencing means are advantageously designed so that a geometric transmission ratio is formed, depending on the difference between the two sensor signals. To determine the actual slip, first and second rpm sensing means can be provided to detect the rpm of the drive end and/or output end, where the output signals of these rpm sensing means can be sent to the influencing means. The influencing means are designed in such a way that an rpm transmission ratio is determined as a function of the output signals of these rpm sensing means. The actual slip of the belt means is determined by comparison of the geometric transmission ratio and the rpm transmission ratio.

The influencing means may be designed so that the slip is regulated to a predetermined value, with the actual slip being compared with a predetermined setpoint to control the slip.

The present invention also relates to a method of operating a belt transmission with an adjustable transmission ratio, with a drive end and an output end, as well as with a belt means for establishing an operative mechanical connection between the drive end and the output end to influence the slip behavior of this connection. Further in the present invention the parts of the belt means moving toward the drive end or the output end and the parts of the belt means moving away from the drive end or the output end are sensed, and the slip of the belt means is influenced according to the parts thus sensed.

BRIEF DESCRIPTION OF THE DRAWINGS

FIG. 5b shows a belt element of the push belt of FIG. 5a.

DETAILED DESCRIPTION

Figure 1:
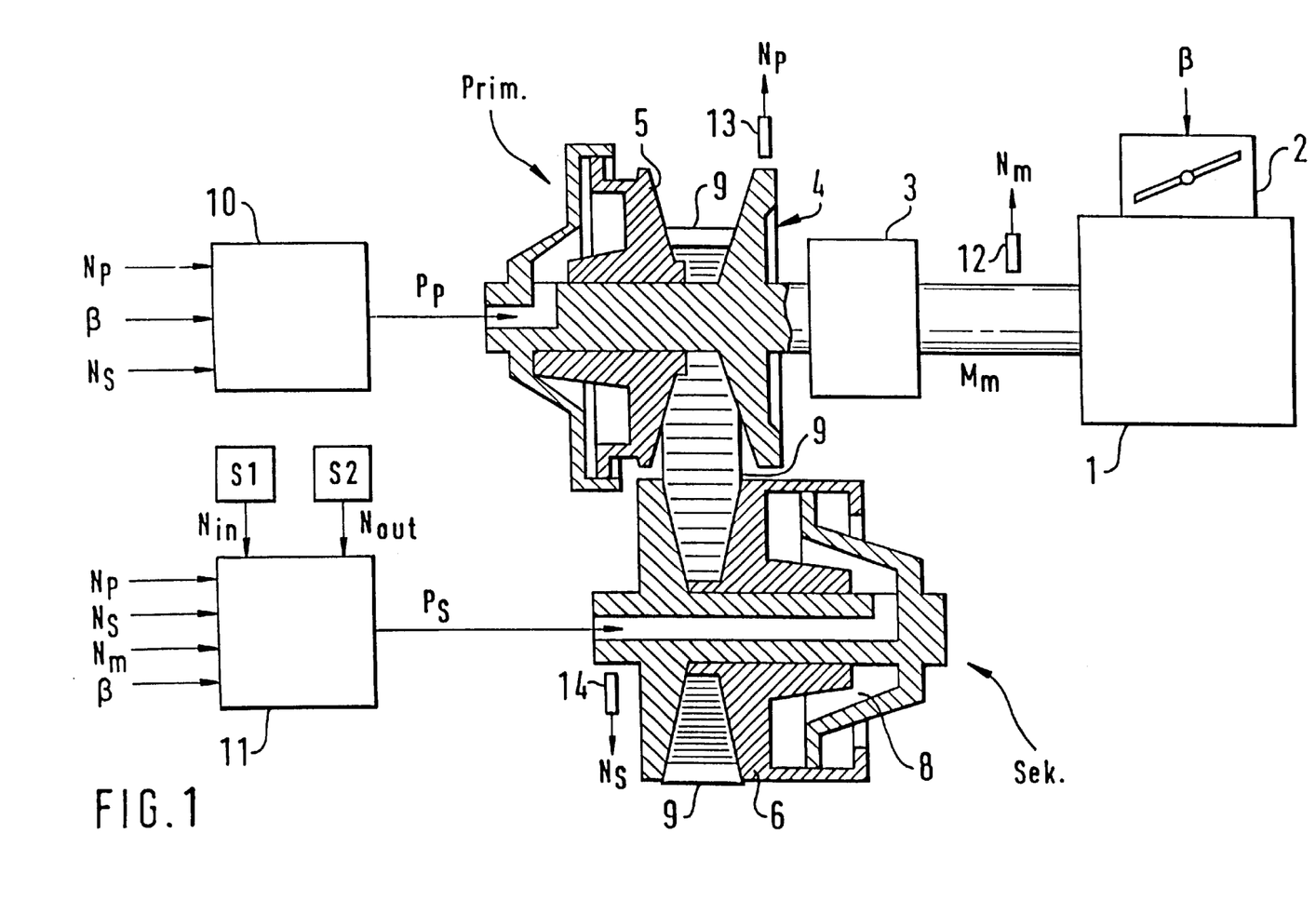
FIG. 1 shows a schematic block diagram with a schematic drawing of a belt transmission according to the present invention.

FIG. 1 shows a sectional view of a belt transmission. Engine torque $M_m$ delivered by internal combustion engine 1 can be influenced by throttle valve 2. Throttle valve 2 is mechanically or electrically connected to the gas pedal (not shown). Internal combustion engine 1 is usually linked to the drive end (primary side) of CVT 4, usually by means of a clutch and/or a converter 3. The output end (secondary side) of CVT 4 is connected to the wheels of the vehicle via a downstream gear (not shown). The CVT has an axially displaceable V-pulley 5 and 6 on the primary and secondary sides, respectively. To adjust the transmission ratio, a suitable primary pressure $P_p$ and secondary pressure $P_s$ are built up in oil chambers 7 and 8, respectively. A suitable choice of primary pressure $P_p$ and secondary pressure $P_s$ as manipulated variables must be made to guarantee that
1. transmission ratio u corresponds to the desired ratio of primary rpm $N_p$ and secondary rpm $N_s$, and
2. force-transmitting push belt 9 (or chain or V belt) is pressed strongly enough against the pulleys to prevent push belt 9 from slipping.

Above-mentioned point 1 is implemented by an electro-hydraulic transmission or primary rpm control 10. A belt tension control 11 is used for point 2.

In the master-slave principle which is illustrated in FIG. 1 and is used frequently, secondary pressure $P_s$ serves to adjust the belt tension and primary pressure $P_p$ serves to adjust the transmission ratio or primary rpm. To regulate the belt tension, in addition to primary rpm $N_p$ and secondary rpm $N_s$, the engine rpm $N_m$ (rpm sensor 12) and output signals $N_{in}$ and $N_{out}$ of sensor units S1 and S2 described below are sent to block 11. Depending on these signals, a secondary pressure $P_s$ to be established is determined. This is described in greater detail below with reference to FIGS. 3 and 4.

With the partner principle as a possible alternative, the belt tension control influences both the primary and secondary pressures.

As mentioned previously, the torque in such a CVT is transmitted with a belt element 9 between the two sets of pulleys shown in FIG. 1. The transmission ratio is varied by adjusting the active radii of the pulleys. The pulley sets are each composed of two truncated cones or V-pulleys which can be shifted with respect to one another. This is shown in the schematic diagram in FIG. 2. Which shows a sectional view perpendicular to the axes of the truncated cones or V-pulleys, with arrow 2 indicating the direction of rotation in the normal forward operation of the vehicle. Belt element 9 is indicated with dash-dot lines in two extreme gear positions $u_{min}$ and $u_{max}$. The primary side on the engine end is labeled as "Prim" and the side facing the wheels is labeled as "Sek."

The active radii for the belt element, which is a push belt 9 in the present example, change due to the displacement of the V-pulleys toward one another. The radius at which belt element 9 acts on the primary side Prim., i.e., the radius at which the force is transmitted, is $r_p$ while that on the secondary side Sek is $r_s$. These radii can be determined as theoretical quantities even if belt 9 does not run ideally on the circle segments thus determined. Length $L_r$ of belt 9 can be assumed as constant. The assumption that the path of belt element 9 is composed of two segments of a circle and two straight line segments (see FIG. 2) is correct in wide ranges of operation and can always be assumed without any great error.

Figure 2:
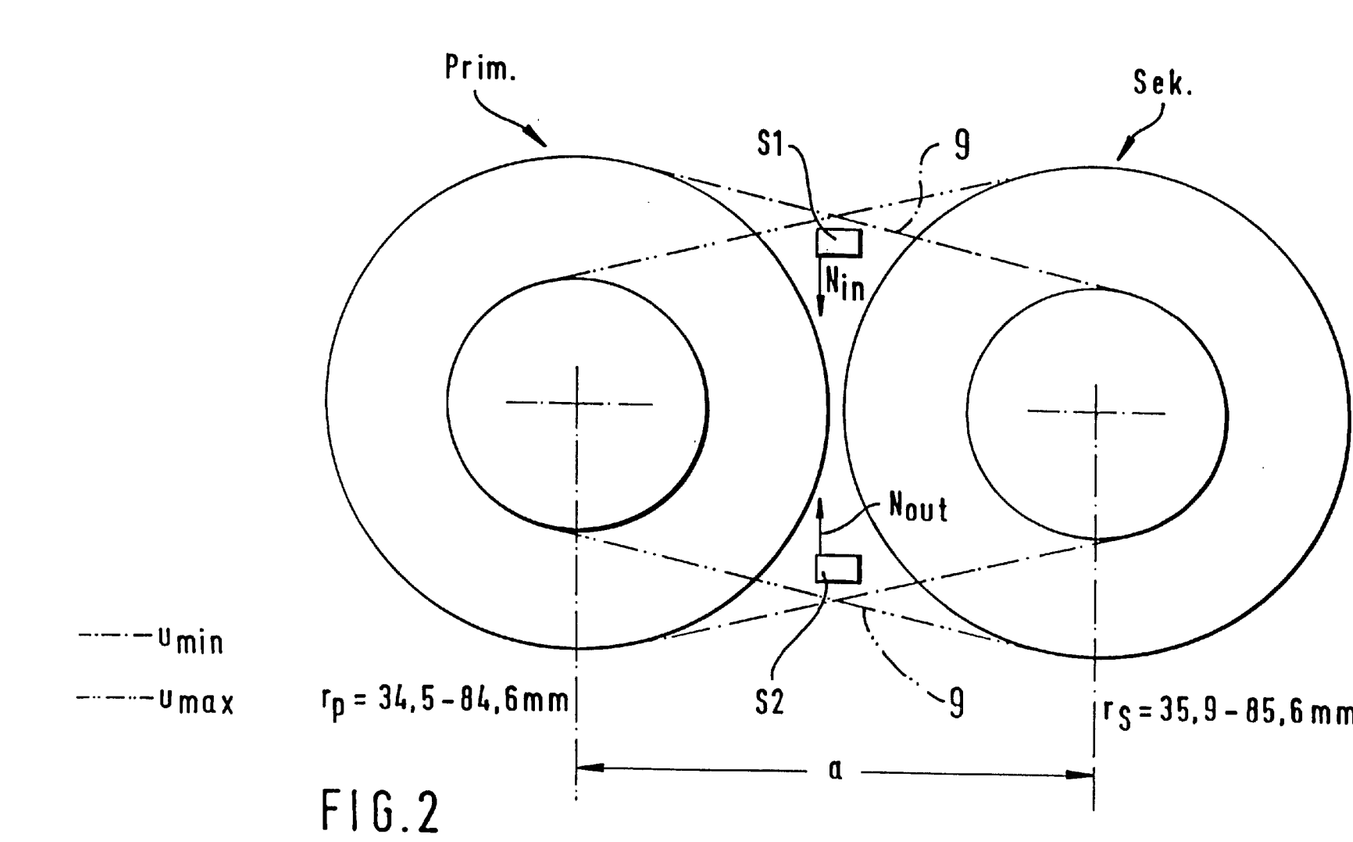
FIG. 2 shows an arrangement of sensor units according to the present invention.

As shown in FIG. 2, the axes of the pulleys have a fixed spacing a. For the idea according to the present invention, one sensor unit each S1, S2 is arranged in the middle between the two pulleys, i.e., at a/2. These sensors S1, S2 are designed to be able to count individual segments 502 or marks on the belt element. The segments or marks are applied to belt element 9 with exactly constant spacings. This will be described in more detail with reference to FIGS. 5a, 5b and 5c.

The idea according to the present invention is based on the fact that length $L_p$ of belt element 9 between sensors S1 and S2 on primary side Prim. (and naturally also on secondary side Sek.) is a direct measure of the geometric transmission ratio $u_{geo}$ (=$r_s/r_p$). This is to be illustrated on the basis of the following analysis of the geometric relationships of the belt transmission.

Length $L_r$ of push belt 9 is obtained as follows:

equation 1:

$$L_r = 2\sqrt{a^2 - (r_p - r_s)^2} + \pi(r_p + r_s) + 2\alpha(r_p - r_s)$$

The geometric transmission ratio $u_{geo}$ is defined as follows:

$$u := u_{geo} = \frac{r_s}{r_p}, \tag{2}$$

where $r_s$ denotes the instantaneously operative secondary radius and $r_p$ is the instantaneously operative primary radius. Angle $\alpha$ between the push belt and the line connecting the axes is (axis spacing a):

equation 3:

$$\alpha = \arcsin\left(\frac{r_p - r_s}{a}\right) = \arcsin\left(\frac{r_p(1-u)}{a}\right)$$

Length $L_p$ of belt 9 between the measurement points of sensor units S1 and S2 is obtained as follows:

$$L_p = L_{up} + 2 * L_{ap} \tag{4},$$

where $L_{up}$ denotes the wrap length of the primary pulley and $L_{ap}$ is the path between the point of contact on the primary pulley and sensor units S1 and S2.

This yields the following results for the wrap length $L_{up}$ of the primary pulley and for the path $L_{ap}$ between the point of contact on the primary pulley and sensor units S1 and S2:

$$L_{up} = \pi r_p + 2\alpha r_p = r_p\left(\pi + 2\arcsin\left(\frac{r_p(1-u)}{a}\right)\right) \tag{5}$$

$$L_{ap} = \frac{a}{2\cos\alpha} - r_p * \tan\alpha \tag{6}$$

Thus, length $L_p$ of the push belt between sensor units S1 and S2 is a function which depends only on primary radius $r_p$:

$$L_p = r_p(\pi + 2\alpha - \tan\alpha) + \frac{a}{\cos\alpha} \tag{7a}$$

$$L_p = r_p\left(\pi + 2\arcsin\left(\frac{r_p(1-u)}{a}\right) - \frac{\left(\frac{r_p(1-u)}{a}\right)}{\sqrt{1-\left(\frac{r_p(1-u)}{a}\right)^2}}\right) + \frac{a}{\sqrt{1-\left(\frac{r_p(1-u)}{a}\right)^2}} \tag{7b}$$

-continued $$L_p = r_p \left[ \pi + 2 \left( \left( \frac{r_p(1-u)}{a} \right) + \frac{\left( \frac{r_p - (1-u)^3}{a} \right)}{6} \right) - \frac{\left( \frac{r_p(1-u)}{a} \right)}{\sqrt{1 - \left( \frac{r_p(1-u)}{a} \right)^2}} \right] + \frac{a}{\sqrt{1 - \left( \frac{r_p(1-u)}{a} \right)^2}} \quad (7c)$$

For a known transmission, $r_p$ is a function of the geometric transmission ratio $u_{geo} = u$, which depends only on the transmission parameter $L_r$ (length of the belt) and a (distance between pulley axes).

$$rp = a * \left( \sqrt{\frac{\pi^2}{4} * \left( \frac{u^2}{(1-u)^4} \right) + \frac{\frac{L_r}{a} - 2}{(1-u)^2} - \frac{\pi}{2} * \frac{u+1}{(u-1)^2}} \right) \quad (8)$$

When equation 8 is substituted into equation 7c, this leads to an equation for determining $L_p$, which depends only on the geometric transmission ratio $u_{geo} = u$ and fixed transmission parameters. If this equation is plotted in a curve, the geometric transmission ratio $u_{geo}$ can be determined from length $L_p$ of belt element 9 stored on the primary side.

If the system operates without any noticeable slip between the belt and pulleys, the geometric transmission ratio $u_{geo}$ must be equal to the rpm transmission ratio $u_N = N_p/N_s$, where $N_p$ and $N_s$ denote the rpm on the primary side and the secondary side, respectively (sensors 13, 14). If these two transmission ratios are not the same, the system operates with a certain belt slippage.

A concrete embodiment is described below with reference to FIGS. 3 and 4.

Figure 4:
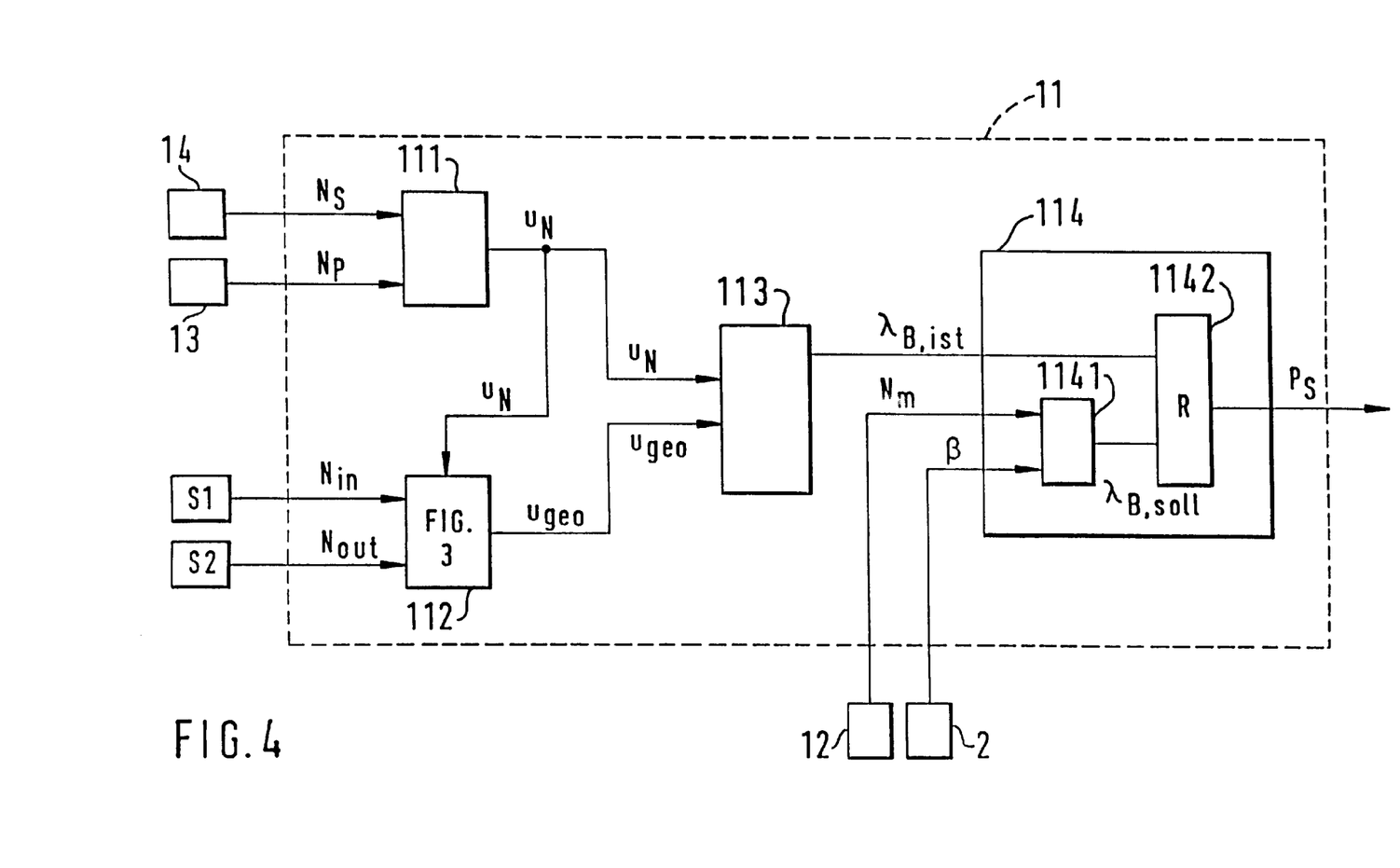
FIG. 4 shows a block diagram for measuring a belt slip according to the present invention.

As shown in FIG. 4, the rpm transmission ratio $u_N = N_p/N_s$ is determined first in block 111 of slip regulator block 11 (influencing means). Block 112 to receives output signals $N_{in}$ and $N_{out}$ of sensors S1 and S2. As mentioned previously, these sensors S1 and S2 are designed to count individual segments 502 or marks on the belt element. The segments or marks are applied to belt element 9 with exactly constant spacings. If the transmission has the direction of rotation indicated by arrow 2 in FIG. 2, sensor unit S1 counts the belt segments $N_{in}$ or belt marks arriving on the primary side, and sensor unit S2 counts the belt segments $N_{out}$ or belt marks moving away from the primary side.

Figure 3:
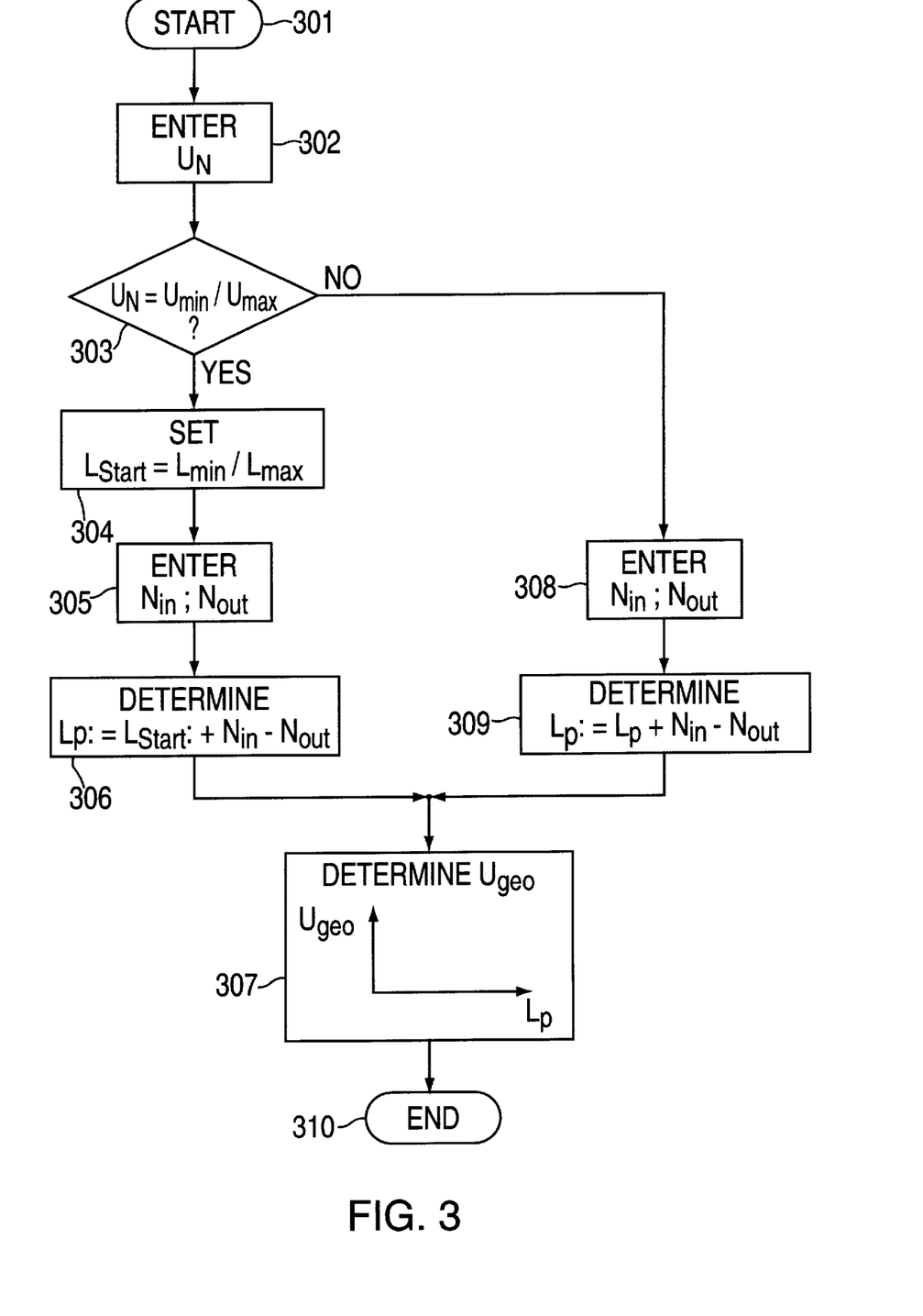
FIG. 3 shows a flow chart according to a method of the present invention.

According to FIG. 3, which shows how block 112 (FIG. 4) functions, the current rpm transmission ratio $u_N$ is entered in step 302 after starting step 301.

In the respective end positions (at the smallest and largest transmission ratios), the number of segments or marks on the primary side and on the secondary side is known. If these operating states prevail (at the smallest transmission ratio $u_{min}$ and at the largest transmission ratio $u_{max}$), the measurement can be simply started. For this reason, an inquiry is performed in step 303 to determine if the operating state is currently $u_{min}$ or $u_{max}$. However, the operating state of minimum or maximum transmission ratio can also be determined through other parameters, e.g., by input of the primary pressure and/or the secondary pressure.

Such an operating state must be achieved at least once at the beginning of the measurement. If a maximum or minimum transmission ratio is found as the operating state in step 303, then starting value $L_{min}$ or $L_{max}$ is set in step 304 as starting value $L_{start}$ for length $L_p$ of belt 9 on the primary side between the measurement points of sensor units S1 and S2.

Output signals $N_{in}$ and $N_{out}$ of sensors S1 and S2 which indicate the segments entering and leaving on the primary side are entered in step 305. In step 306, the actual length $L_p$ of belt 9 is determined on the primary side between the measurement points of sensor units S1 and S2 so that the number of incoming segments is added to starting value $L_{start}$ and the number of outgoing segments is subtracted from said starting value.

Then in step 307 the geometric transmission ratio $u_{geo}$ is determined from value $L_p$ obtained from the curve derived above (equations 7c and 8).

If it is found after a first start run in step 303 that an extreme transmission ratio $u_{min}$ or $u_{max}$ has not been set, then in step 308 output signals $N_{in}$ and $N_{out}$ of sensors S1 and S2 are entered; these signals indicate the segments entering and exiting, respectively, on the primary side. In step 309, the actual length $L_p$ of belt 9 is determined on the primary side between the measurement points of sensor units S1 and S2 in such a way that the number of incoming segments is added to the value $L_p$ determined previously, and the number of outgoing segments is subtracted from the value $L_p$. The geometric transmission ratio is determined in block 307 described above.

An actual value $\lambda_{B,ist}$ for belt slip $\lambda_B$ is calculated from the actual rpm transmission ratio $u_N$ determined in blocks 111 and 112 in FIG. 4 and the actual geometric transmission ratio $u_{geo}$ (for example, by forming the difference). This value $\lambda_{B,ist}$ is then compared with a corresponding setpoint $\lambda_{B,soll}$ in block 114, whereupon the belt tension is adjusted (for example, by adjusting secondary pressure $P_s$ in the master-slave principle mentioned above) depending on this comparison so that there is no slip (controller R, block 1142).

Setpoint $\lambda_{B,soll}$ for the belt slip is determined, as mentioned above, by taking into account engine torque and engine rpm.

Figure 5A:
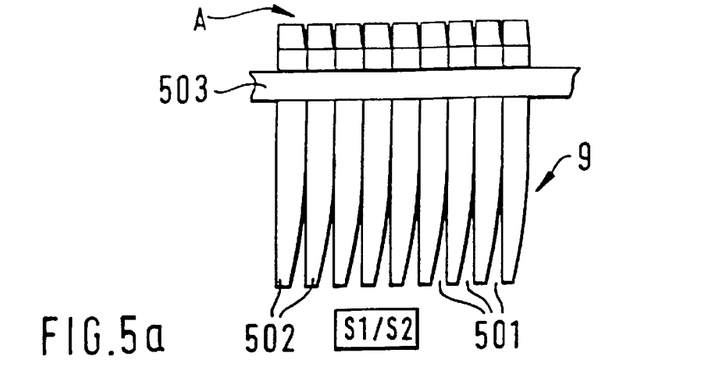
FIG. 5a shows a conventional push belt.
Figure 5B:
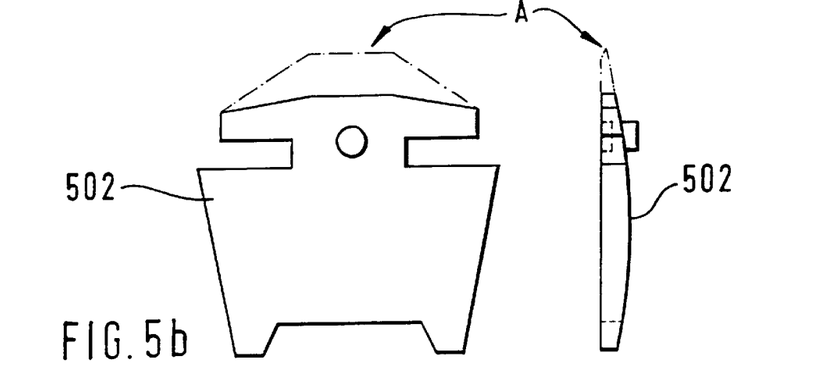
Figure 5C:
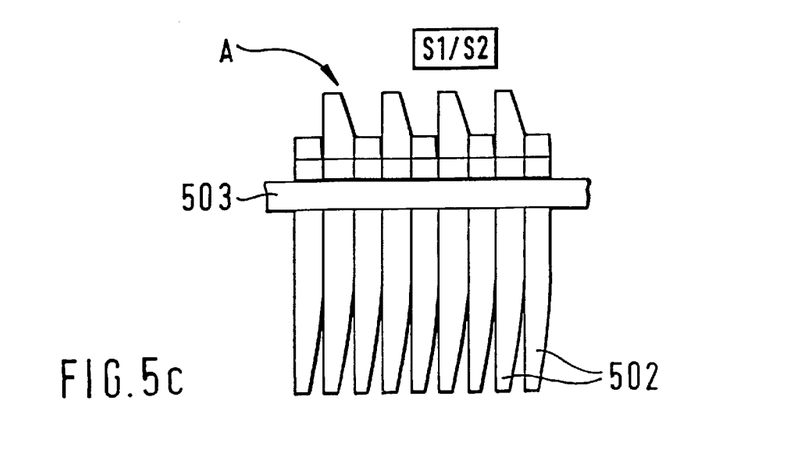
FIG. 5c shows a belt element according to an embodiment of the present invention.

FIGS. 5a, 5b, and 5c show embodiments of belt segments or belt marks.

A push belt is known to comprise a number of segments 502 held together by an elastic steel ring 503. FIG. 5a shows a conventional push belt 9 with individual segments 502, and FIG. 5b shows an individual segment 502 (not including the part shown with dotted lines).

As shown in FIG. 5a, it is not necessary with conventional push belts to apply marks that can be analyzed because the segments themselves can be counted even on the basis of gaps 501 detected by suitable known magnetic sensors S1 and S2. In addition, the use of known eddy current sensors is also possible in particular.

Another possibility for even more distinct detection of segments 502 is shown in FIG. 5c, where every second segment 502 has been lengthened by a few millimeters on the outside A of the belt (see also the dotted-line portion of segment 502 in FIG. 5b). Such a mark is even simpler to detect than the gaps on the inside of the conventional belt shown in FIG. 5a. In the embodiment shown in FIG. 5c, sensor units S1 and S2 must of course be arranged on the outside of the belt.

What is claimed is:

1. A device for operating a belt transmission having an adjustable transmission ratio, the belt transmission including a belt for establishing an operative mechanical connection between a drive end and an output end of the belt transmission, in which a slip between the belt and at least one of the drive end and the output end may vary, the device comprising:

means for influencing the slip; and a plurality of sensor units, each one of the plurality of sensor units having an output coupled to the means for influencing and being adapted to be arranged in a vicinity of the belt between the drive end and the output end, each of the plurality of sensor units being adapted to provide an output signal to the means for influencing the slip.

2. The device according to claim 1, wherein each of the plurality of sensor units is adapted to detect a change in a relative position between the belt and the plurality of sensor units.

3. The device according to claim 1, wherein the plurality of sensors is adapted to detect a plurality of individual belt segments of the belt, which is arranged to move by the plurality of sensor units, and wherein the output signal of each of the plurality of sensor units represents a movement of the plurality of individual belt segments of the belt by the plurality of sensor units.

4. The device according to claim 3, wherein a first output signal of one of the plurality of sensor units represents a first set of segments of the plurality of individual belt segments moving toward one of the drive end and the output end, and a second output signal of another one of the plurality of sensor units represents a second set of segments of the plurality of individual belt segments moving away from one of the drive end and the output end.

5. The device according to claim 4, wherein the means for influencing determines a geometric transmission ratio depending on a difference between the output signal of one of the plurality of sensor units and the output signal of another one of the plurality of sensor units.

6. The device according to claim 1, wherein at least one of the drive end and the output end has at least one axially displaceable element in a form of a V-pulley.

7. The device according to claim 1, wherein the belt is one of a push belt, a V belt, and a chain, and the belt is stretched between and wrapped around the drive end and the output end.

8. The device according to claim 1, further comprising:
means for detecting a first rpm of one of the drive end and the output end and for sending to the means for influencing a first output signal representing the first rpm; and
means for detecting a second rpm of another one of the drive end and the output end and for sending to the means for influencing a second output signal representing the second rpm, wherein the means for influencing determines an rpm transmission ratio as a function of the first output signal and the second output signal, and the means for influencing determines an actual slip between the belt and at least one of the drive end and the output end by comparing the geometric transmission ratio and the rpm transmission ratio.

9. The device according to claim 8, wherein the means for influencing regulates the slip in accordance with a predetermined value, in which the actual slip is compared with a predetermined setpoint to control the slip.

10. The device according to claim 1, wherein the means for influencing operates based on a first transmission ratio and a second transmission ratio.

11. The device according to claim 10, wherein the first transmission ratio is a revolution-rate transmission ratio and the second transmission ratio is a geometric transmission ratio.

12. The device according to claim 1, wherein the means for influencing operates based on a comparison of a first transmission ratio and a second transmission ratio.

13. The device according to claim 12, wherein the first transmission ratio is a revolution-rate transmission ratio and the second transmission ratio is a geometric transmission ratio.

14. The device according to claim 1, wherein the slip is controlled to a predetermined value based on a comparison of an actual slip and a predetermined slip.

15. The device according to claim 1, wherein the drive end is a drive end pulley and the output end is an output end pulley, and the transmission ratio is varied by adjusting an active radius of at least one of the drive end pulley and the output end pulley.

16. The device according to claim 1, wherein the means for influencing operates based on an actual slip value that is determined from a first transmission ratio and a second transmission ratio.

17. The device according to claim 16, wherein the drive end is a drive end pulley and the output end is an output end pulley, and the transmission ratio is varied by adjusting an active radius of at least one of the drive end pulley and the output end pulley.

18. The device according to claim 16, wherein the first transmission ratio is a revolution-rate transmission ratio and the second transmission ratio is a geometric transmission ratio.

19. The device according to claim 1, wherein the drive end is a drive end pulley and the output end is an output end pulley, and the transmission ratio is varied by adjusting an active radius of at least one of the drive end pulley and the output end pulley, and the means for influencing operates based on an actual slip value, which is determined from a revolution-rate transmission ratio and a geometric transmission ratio, and a setpoint slip value.

20. A method of operating a belt transmission having an adjustable transmission ratio, the belt transmission including a belt having a plurality of parts for establishing an operative mechanical connection between a drive end and an output end of the belt transmission, in which a slip between the belt and at least one of the drive end and the output end may vary, the method comprising the steps of:

producing a first signal representative of a detection of which ones of the plurality of parts of the belt are moving toward one of the drive end and the output end;

producing a second signal representative of a detection of which ones of the plurality of parts of the belt are moving away from one of the drive end and the output end; and influencing the slip as a function of at least one of the first signal and the second signal.

* * * * *

UNITED STATES PATENT AND TRADEMARK OFFICE
CERTIFICATE OF CORRECTION

PATENT NO. : 6,146,294
DATED : November 14, 2000
INVENTOR(S) : Martin-Peter Bolz It is certified that error appears in the above-identified patent and that said Letters Patent is hereby corrected as shown below:

Column 1,
Line 3, insert -- BACKGROUND INFORMATION --.
Line 6, delete "... should be ...".
Line 7, change "... systems belt ..." to -- systems, a belt --.
Line 44, change "... influence, an ..." to -- influence; an--.

Column 2,
Line 34, change "... invention ..." to -- invention, --.

Column 3,
Line 34, change "... FIG.2. Which ..." to -- FIG. 2, which --.

Column 5,
Line 37, change "A concrete embodiment is ..." to -- An embodiment for mearsuring a belt slippage is --.
Line 41, delete "... to...".

Signed and Sealed this

Eleventh Day of September, 2001

Attest:

*Nicholas P. Godici*

NICHOLAS P. GODICI
*Attesting Officer*    *Acting Director of the United States Patent and Trademark Office*